(12) United States Patent
Gilger

(10) Patent No.: US 9,336,620 B2
(45) Date of Patent: May 10, 2016

(54) ADVANCED DATA VISUALIZATION SOLUTIONS IN HIGH-VOLUME DATA ANALYTICS

(71) Applicant: VISUALCUE TECHNOLOGIES LLC, Orlando, FL (US)

(72) Inventor: Kerry D. Gilger, Orlando, FL (US)

(73) Assignee: Visualcue Technologies, LLC, Orlando, FL (US)

( * ) Notice: Subject to any disclaimer, the term of this patent is extended or adjusted under 35 U.S.C. 154(b) by 16 days.

(21) Appl. No.: 14/302,744

(22) Filed: Jun. 12, 2014

(65) Prior Publication Data

US 2014/0292795 A1  Oct. 2, 2014

Related U.S. Application Data

(63) Continuation of application No. 12/205,259, filed on Sep. 5, 2008, now Pat. No. 8,767,012.

(60) Provisional application No. 60/970,827, filed on Sep. 7, 2007.

(51) Int. Cl.
| | |
|---|---|
| *G06T 15/00* | (2011.01) |
| *G06T 11/60* | (2006.01) |
| *G06F 3/0481* | (2013.01) |
| *G06Q 10/00* | (2012.01) |
| *G06T 11/00* | (2006.01) |
| *G06T 11/20* | (2006.01) |

(52) U.S. Cl.
CPC ............ *G06T 11/60* (2013.01); *G06F 3/04817* (2013.01); *G06Q 10/00* (2013.01); *G06T 11/001* (2013.01); *G06T 11/206* (2013.01); *G09G 2320/06* (2013.01)

(58) Field of Classification Search
CPC .... G06Q 10/00; G09G 2320/06; G06T 11/60; G06T 11/001; G06T 11/206; G06F 3/04817
USPC .......... 345/589, 440, 629, 581; 715/243, 246, 715/751, 764
See application file for complete search history.

(56) References Cited

U.S. PATENT DOCUMENTS

| | | |
|---|---|---|
| 5,321,800 A | 6/1994 | Lesser |
| 7,573,487 B1 | 8/2009 | Petersen |
| 8,139,063 B2 | 3/2012 | Helfman et al. |
| 8,254,282 B2 | 8/2012 | Young et al. |
| 8,286,100 B2 | 10/2012 | Helfman et al. |
| 8,444,464 B2 | 5/2013 | Boch et al. |

(Continued)

OTHER PUBLICATIONS

Benson et al., "Poster: Using Orthographic Projection and Animation to Convey Treemap Structure", 2010, pp. 1-2.

*Primary Examiner* — Phu K Nguyen
(74) *Attorney, Agent, or Firm* — Stephen C. Thomas; Courtney Dunn

(57) ABSTRACT

A system and method for creating a visual perspective of operational information that facilitates rapid decision making. The system and method merges existing data sources from any number of computer-fed external data sources through an applications server to display data sets in easily recognizable, repeatable images (tiles) uniquely designed for a user's application. The system and method creates visual perspectives of data that accelerate decision-making and problem-solving processes by displaying repeatable images (tiles) that display performance results versus expected performance criteria in high-volume, intuitive displays.

18 Claims, 10 Drawing Sheets

(56) References Cited

U.S. PATENT DOCUMENTS

| | | |
|---|---|---|
| 8,504,347 B2 | 8/2013 | Kosugi |
| 8,516,392 B2 | 8/2013 | Ostroff |
| 8,767,012 B2 * | 7/2014 | Gilger .................... G06Q 10/00 345/440 |
| 2004/0088377 A1 | 5/2004 | Henriquez |
| 2004/0168115 A1 | 8/2004 | Bauernschmidt et al. |
| 2005/0151737 A1 | 7/2005 | Chiu et al. |
| 2005/0283742 A1 | 12/2005 | Gusmorino et al. |
| 2007/0168266 A1 | 7/2007 | Questembert |
| 2009/0002370 A1 | 1/2009 | Helfman |
| 2009/0013287 A1 | 1/2009 | Helfman et al. |
| 2009/0048959 A1 | 2/2009 | Omura et al. |
| 2009/0125825 A1 | 5/2009 | Rye et al. |
| 2011/0004830 A1 | 1/2011 | Von Kaenel et al. |

* cited by examiner

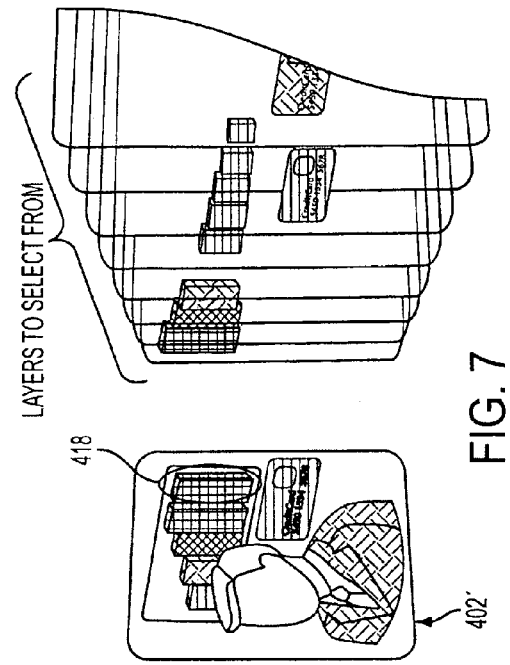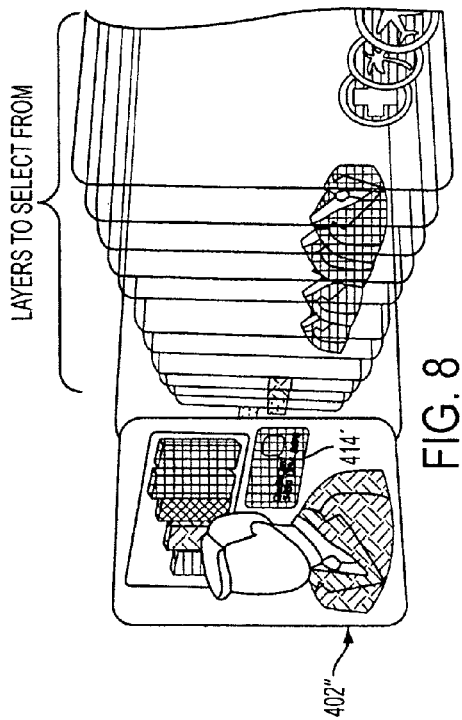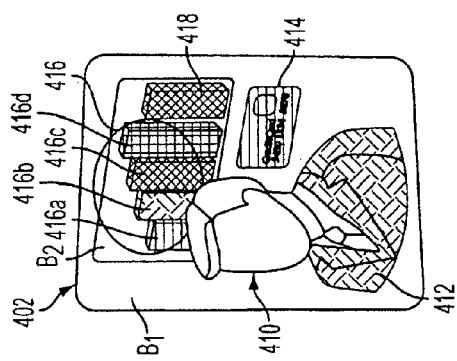

ADVANCED DATA VISUALIZATION SOLUTIONS IN HIGH-VOLUME DATA ANALYTICS

RESERVATION OF COPYRIGHT

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

BACKGROUND

Due to the Internet and wireless technology, data has never been more plentiful and available. Transactional applications such as ERP (enterprise resource planning), SCM (supply chain management), CRM (customer relationship management) and enterprise project management have matured and now gather large volumes of information about internal and external business processes. The gathering and use of unstructured data has also increased from the widespread use of web sites, email, knowledge management, XML (extensible markup language) and enterprise storage systems and will continue to do so as future applications are developed.

Unfortunately, having access to data is not the same as effectively using it. Users with the opportunity to analyze more data are often overwhelmed and frustrated by the amount of effort required to make sense of it all. Most organizations today use tools that were developed when networks and processors were slow, disk space was expensive and databases were unable to handle complex queries. These applications failed to present information clearly to business users when there were multiple dimensions of data to integrate into a decision.

Data in high-level summaries, such as simple dashboards, is presented in a rigid fashion and does not provide explanations of "why" results are as they appear. The drill-downs to detailed reports and associated search tools generate simple row and column views that have become long lists with text or numbers displayed out of context. More often than not, workers are unable to find answers to their questions through these systems alone. Because business people do not have a way to access and explore their data themselves, they usually end up either operating without the information or creating their own ad-hoc desktop solution.

Traditionally, business intelligence tools have attempted to accomplish this through end-user dashboards that link static reports and expose development tools. But simple dashboard gauges fail to capture complex business problems. At the same time, the number of columns and rows in static reports has grown well beyond end users' ability to quickly get meaning from the data. And, both dashboards and static reports fail to consider more than a few dimensions of data—thus failing to provide a true representation of today's more sophisticated business environments. Moreover, while graphical elements such as line and pie charts might be included in a static report, they display data in only one or two dimensions and cannot show relationships with data in other reports, which is undesirable.

The complexity of businesses has out-paced today's decision-making tools. As a result, organizations are struggling to make use of the volumes of information available to them. Workers spend too much time creating reports manually, and the growing list of custom reporting requests is overwhelming information technology (IT) staff. Moreover, the traditional means of generating reports and dashboards need to be extended to help users answer the complex questions that affect corporate performance. New solutions are required to keep pace with growing business complexity. It is not easy to create a self-service interface in which business users can intuitively explore and understand high volumes of data.

One attempt to overcome the above-noted problems is disclosed in U.S. Pat. No. 5,321,800. The '800 patent discloses an information presentation method for a subject being monitored. In the only illustrated embodiment, display segments of fixed size, shape and location are used to map out a human body (the subject) being analyzed by a physician or lab technician. Each portion of the body being monitored is associated with a datapoint. Rectangular-shaped icons are placed in the pre-defined segments in the human body display to show the status of the datapoint. The icons can have one of a plurality of colors. In addition, effects, such as changing the intensity of an icon's color, flashing/modulating the icon, and/or placing a different color in the center portion of an icon can also be used to provide status information.

The technique disclosed in the '800 patent, however, remains unsatisfactory for real time repetitive data analysis, particularly when there are numerous datapoints or subjects to monitor. For example, the technique is tied to the use of rectangular icons for conveying status information of every datapoint being evaluated. Because each icon has the same shape, the icons must be placed in specific locations to represent the datapoint of interest; this forces the observer to remember numerous datapoint-to-location correlations for a single subject (e.g., as shown in FIG. 3 of the '800 patent, the head portion alone contains 18 different datapoint locations). Moreover, if images for multiple subjects are displayed at the same time, it may be difficult to quickly determine the status of a particular datapoint or datapoints.

Accordingly, there is a need and desire for a technique that creates a suitable visual perspective of high volume, repetitive data that allows an observer to quickly determine the status of a particular subject (i.e., person, thing, business) being monitored even when multiple subjects are being monitored at the same time.

BRIEF DESCRIPTION OF THE DRAWINGS

FIG. 6 illustrates an example tile from the FIG. 5 mosaic display.

FIG. 7 illustrates a modified version of the FIG. 6 title using layering in accordance with an embodiment of the invention.

FIG. 8 illustrates a modified version of the FIG. 7 title using layering in accordance with an embodiment of the invention.

DETAILED DESCRIPTION

Figure 1:
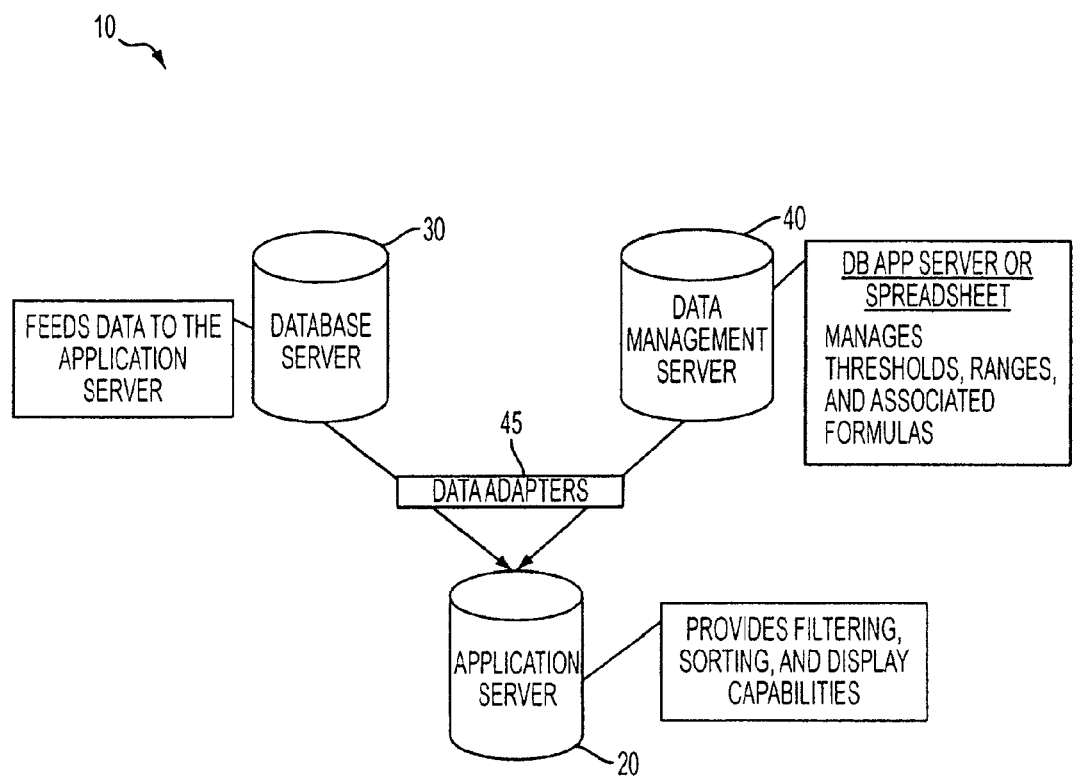
FIG. 1 illustrates a block diagram of an example system according to an embodiment of the invention.

Example embodiments and applications will now be described. Other embodiments may be realized and structural or logical changes may be made to the disclosed embodiments. Although the embodiments disclosed herein have been particularly described as applied to a business or office environment, it should be readily apparent that the embodiments may be embodied for any use or application having the same or similar problems.

Embodiments disclosed herein relate to a system for creating, and outputting to a user device, a visual perspective of operational information that facilitates rapid decision making by a user/observer of the system. Embodiments disclosed herein create visual displays of high volume, repetitive data generated from multiple operational sources. Display tiles, formed using individual layers of images that represent individual attributes being monitored, make up an overall mosaic display that provides a picture of the status of an entire system. Each tile in the display provides information about one discrete component (e.g., employee, seaport, cargo container) within the system being monitored. Each tile contains a plurality of image layers. Each layer consists of an image associated with an attribute being monitored. Each layer is linked to a value, threshold, or range of values so that a current state of that attribute is displayed within the tile. The images from the active layers create the unified image of the tile.

Unlike other systems, the image layers are designed to represent the attribute associated with that layer so that the attribute is easily recognizable from the image itself. The images of each layer are chosen to be easily recognizable as (or associated with) the attribute being monitored. In disclosed embodiments, there can be multiple layers that may have same image, but different color to represent a different status of the attribute. For example, dark blue may indicate a status that is severely below what is expected; light blue may indicate a status that is slightly below what is expected; green may indicate a status that the attribute (e.g., sales by a salesperson) is meeting expected performance; orange may indicate a status that is slightly above what is expected; and gold may indicate a status that greatly exceeds expectation. However, the ability to distinguish various states of an attribute is not limited to colors, but can also be extended by using different images. For example, an image of a man or a woman can indicate the gender of the salesperson. Another way to distinguish the state of an attribute is by having images of different sizes. For example, the size of the bars in a bar graph may vary to further indicate the status of the attribute being monitored.

In operation, when input data dictates that an attribute has a changed status, a new layer containing the appropriate image is brought to the top of the other layers, which supplants the prior image of that attribute, but does not change the images of other elements/attributes being displayed using the other layers. The changing mosaic allows observers to quickly and accurately make the decisions required to maintain the appropriate operational level for the entire system and rapidly pinpoint areas that need to be addressed.

FIG. 1 illustrates a block diagram of an example system 10 constructed in accordance with an embodiment of the invention. The system 10 comprises an application server 20, database server 30 and data management server 40. The application server 20 is connected to the database server 30 and the data management server 40 via data adapters 45.

The application server 20 accepts input through a data adapter 45 with links to the original data repository/data source and to the management server 40. The management server 40 may comprise spreadsheets, database tables, data streams and/or reports. The application server 20 links the input to a set of image layers that are being used to represent attributes being monitored. The application server 20: (1) monitors the ranges or discrete values of the data associated with the attributes that are associated with each image layer; (2) feeds the display with the properly compiled image layers to produce a unified display tile; and (3) provides sorting and filtering capabilities according to the values and the proper association to the tiles.

The database server 30 serves as a data source that provides data to the application server 20 (through a data adapter 45). The data can be collected from any of numerous sources, and it should be appreciated that how the data is collected is not important as long as the relevant data is collected. For example, sales data from different regions can be obtained in different formats. For example, sales data from North America is available from a Microsoft SQL Server database, data from Europe is obtained from an Excel spreadsheet, and data from Far East Asia in kanji and katakana Japanese scripts is provided in a text file. A data adapter 45 can collect data from these different sources, run the translation if necessary and present the data to the application server 20. The data management server 40 provides a vehicle to easily set up parameters for the ranges and thresholds used by the application server 20. It should be appreciated that the servers 30, 40 may be connected to a variety of data sources, to produce similar results discussed herein, as long as the application server 20 is programmed to manage the resultant displays, perform the necessary value monitoring, and perform the resultant technical management of image layer/input data value correlation. It should also be appreciated that in some applications, a data management server 40 may not be required since the application server 20 may be programmed handle the functions of the data management server 40. Moreover, it should also be appreciated that a single server computer can implement the functionality of the application server 20, data management server 40 and database server 30, if desired and system requirements allow.

Although not shown in FIG. 1, a user interface/display mechanism (e.g., an Internet browser, PDA, web enabled device) in communication with the application server 20 is used to display the operational status of the monitored system using multiple tiles arranged according to user definable desired patterns. Example mosaic displays and tiles are discussed below with reference to FIGS. 3, and 5-20. The concept of layering is also discussed below with reference to FIGS. 4a and 4b.

Figure 2:
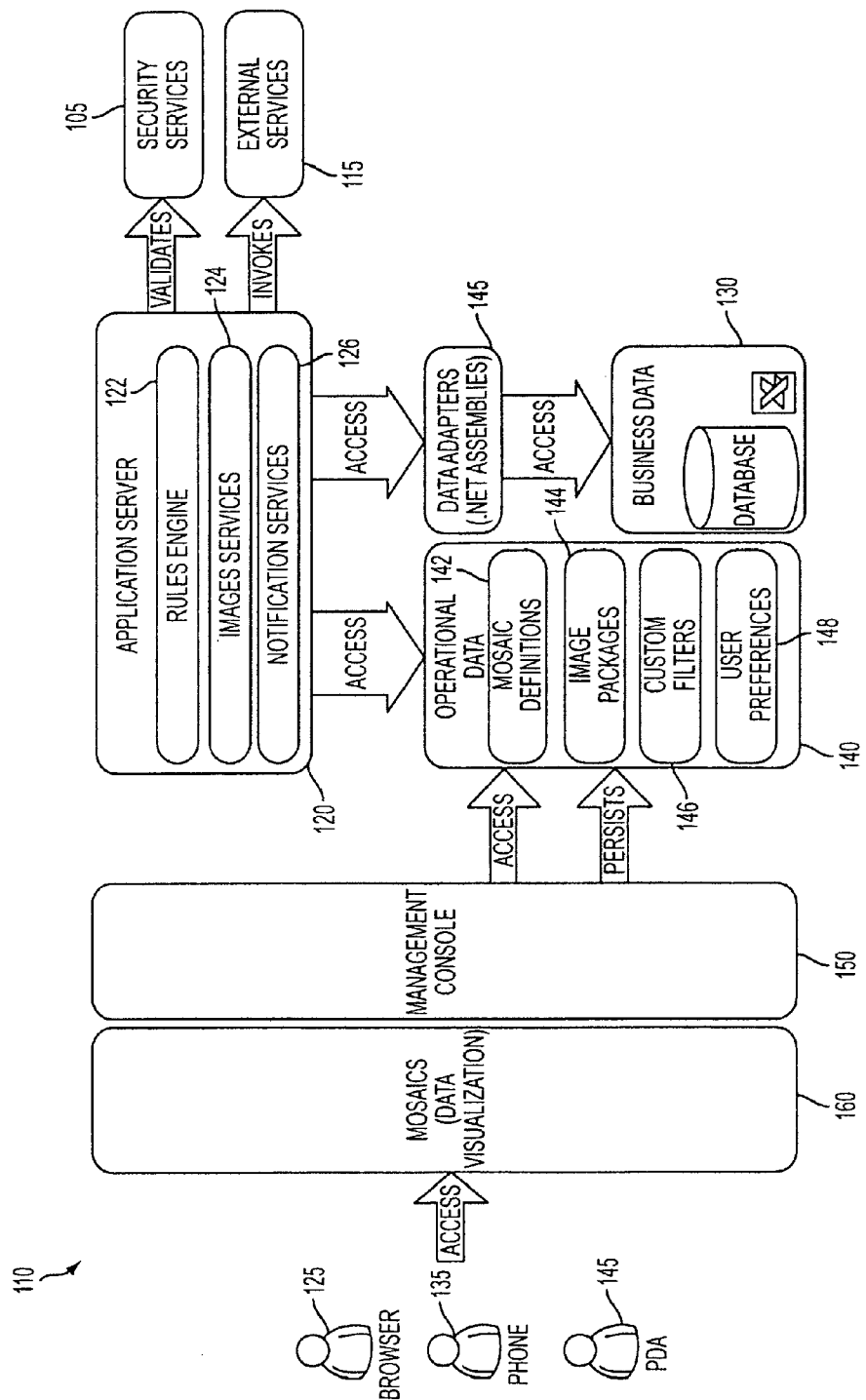
FIG. 2 illustrates a block diagram of another example system constructed in accordance with an embodiment of the invention.

FIG. 2 illustrates a block diagram of another example system 110 constructed in accordance with an embodiment of the invention. The system 110 comprises an application server 120, database server 130, and data management server 140. The application server 120 is shown accessing security services 105 and external services 115, the data management server 140 and the database server 130 (via data adapters 145). User interface devices such as an Internet browser 125, Internet enabled telephone 135 and PDA (personal digital assistant) 145 can access a mosaic display 160 output from the system 100. A management console 150 is shown having access to the data management server 140.

The application server 120 delivers a client application to the user/observer's devices 125, 135, 145 or computer (not shown) typically over the Internet and using the hypertext transfer protocol (HTTP) or by any known mechanism. The application server 120 handles the business logic required for the application by encapsulating a rules engine 122 and an image services function 124. The application server 120 may optionally notify or invoke external services using a notification service function 126. The application server 120 handles data accesses through the data adapters 145. As is described in more detail below, the application server 120 is responsible for generating the mosaic display 160 such that users/observers can determine the status of the monitored system in a manner that is currently unavailable in prior art systems.

In a preferred embodiment, the data adapters 145 are Microsoft® ".NET" assemblies (although not limited to the said platform or programming language) that provide for extracting, transforming, and loading (ETL) of business data as is known in the art. The extract stage, generally reads data from the database server 130; however, a data adapter 145 can extract data from different source systems that may use different data organization formats. Data adapters 145, during the transform stage, may optionally apply a series of rules or functions prior to or after the data is extracted to derive data that meets the business and the technical needs of validating, cleansing, and/or manipulating of the data. The load phase loads the data into the application server 120.

The management console 150 provides access and persists various resources such as mosaic definitions 142, image packages 144, user defined filters 146, and user preferences 148, collectively referred to as "operation data" and stored in the data management server 140. The mosaic display 160 is the data visualization component of the system 110. After the relevant business data is processed by the rules engine 122, the image services function 124 renders the data as display tiles (discussed below in more detail). The mosaic display application 160 displays the tiles, allowing the end user to sort through and filter the visual data (referred to herein as "visual data-mining"). It should be appreciated that a single server computer can implement the functionality of the application server 120, data management server 140 and database server 130, if desired and system requirements allow.

Figure 3:
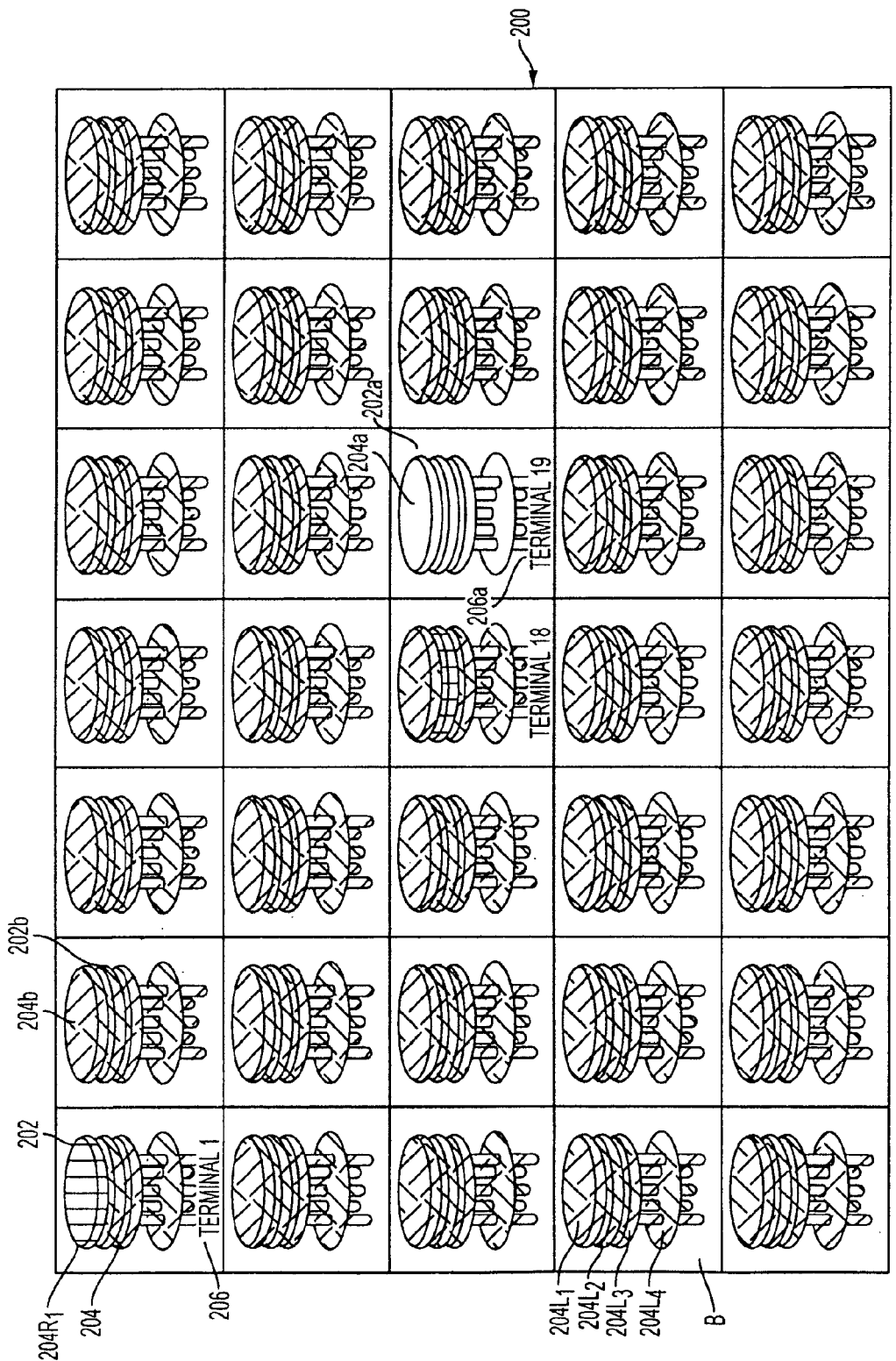
FIG. 3 illustrates an example mosaic display output from a system constructed in accordance with an embodiment of the invention.

FIG. 3 illustrates an example mosaic display 200 output from a system constructed in accordance with an embodiment of the invention (e.g., systems 10 or 110). The display 200 comprises a plurality of display tiles 202 shown in an array of rows and columns, each tile 202 comprising an object 204 or objects being monitored by the system. Optionally, text labels 206 can be included within, or adjacent to, a tile 202 to provide additional information about the tile 202 or its object 204. In the illustrated embodiment, the label 206 associates display tile 202 and object 204 with "Terminal 1" while another label 206a associates tile 206a and object 204a with "Terminal 19". Other tiles e.g., tile 202b and its associated object 204b are not associated with a label.

As mentioned above, each display tile is made up of images from a plurality of image layers, each layer corresponding to an attribute being monitored. For example, in FIG. 3, each tile 206 represents a seaport. The image layers within a seaport tile 206 represent the status of specific attributes of the seaport. For example, each tile 206 has an object 204 comprising a layer 204L1 having an image of a first portion of the seaport object 204 that is associated with the communications status of the seaport; each tile 206 has a layer 204L2 having an image of a second portion of the seaport object 204 that is associated with the electrical status of the seaport; each tile 206 has a layer 204L3 having an image of a third portion of the seaport object 204 that is associated with the mechanical status of the seaport; and each tile 206 has a layer 204L4 having an image of a fourth portion of the seaport object 204 that is associated with the mooring status of the seaport. A background B, although not required, is used in the illustrated embodiment to fulfill the tile 202. Combined, the layers 204L1, 204L1, 204L1, 204L1, comprise the object 204 of an individual tile 202.

Each layer has an image associated with a specific attribute being monitored. According to a preferred embodiment, there are multiple layers having the same image, but each layer contains an image that is varied by color or other design to represent a potential status of that attribute. For example, a gray version of the image on a layer (e.g., object 204a having all gray layers illustrated) may represent no information, a red version (e.g., object 204 in tile 202 has a red layer 204R1 while the remaining layers are green) may represent a state requiring that law enforcement be notified, and a green version (e.g., object 204b of tile 206b) may represent a normal status. It should be appreciated that the color/status correlations described herein are examples and are not provided to limit the claimed invention. When the selected image layers for the seaport are combined, the unified image layers complete the object 204 inside the tile 202. Repeatable tiles 202 in a display showing e.g., ports across the country, complete the mosaic display 200 giving an accurate representation of the entire system. The changing mosaic display 200 allows observers to quickly and accurately make the decisions required to maintain the appropriate operational level for the entire system and rapidly pinpoint areas that need to be addressed.

It should be appreciated that the embodiments of the invention are not limited to the illustrated seaport example. The principles disclosed herein can be used for any type of business, medical, military, social, etc. activity that needs to examine repeatable datasets that have a frequency of change. A detailed example is described below with reference to FIGS. 5-10.

The embodiments of the invention employ a data feed from existing data sources (from databases, sensors, etc) and provide a layered representation of the relevant data. Each layer is linked to a value, threshold, or range of values so that a current state of that attribute is displayed in a unified representation in a repeatable display tile. Tiles have additional capabilities of showing labels, values, photographs, clipart, symbols, words, and/or additional color variations, and tile perimeter handles that allow for a drill down to the values being displayed, or when multiple tiles are selected to show comparisons between the selected tiles.

The FIG. 3 example is suitable for a Homeland Security system that would display the operational status of many seaports around the country. Although not illustrated in FIG. 3, the status of each seaport may also comprise monitoring shipping delays, utility status, container content sensors, seaport alerts, and passengers on watch lists who have or are being checked in. Each of these attributes may have a variety of levels indicating normalcy, below expectations or even heightened alert. Thus, the embodiments disclosed herein should not be limited to the illustrated examples. The applications server 120 (FIG. 2) connects to the data sources and inputs data for each of the attributes required to monitor the current state-of-health/operational status of the seaport and then feed the display 160 (FIG. 2) showing that state-of-health/operational status. The unique nature of the display consists of a composite image representing the seaport. That composite image could look similar to a seaport terminal with different, distinct parts of the terminal image representing an item such as "container content sensor" (see e.g., FIG. 18 discussed below). One of the multiple layers representing the different potential states of "container content sensor" can be triggered to become visible through the centrally fed applications server 120. These triggers could be discrete numbers or states or even a range of numbers.

The resultant seaport pictogram shows a unified display depicting the state-of-health/operational status of that seaport. If there were hundreds of seaports, the repeatable image would show a display that indicates the state-of-health/operational status of all of them on a single screen (e.g., FIG. 3 illustrates 35 seaport tiles). Because the images on the layers that are different in individual tiles are distinguishable from other image layers of other tiles, they stand out even in a display containing hundreds of seaports. An agent who is monitoring the seaports can then click on the seaport tile of interest and rapidly determine the reasons for the different statuses. A screen showing multiple seaports could be sorted to show which seaports are showing "customs delays" or those with power outages or any other item of interest that is being monitored. The screen can also be filtered to show only those seaports that meet certain monitoring criteria. Moreover, in response to a user input (via e.g., mouse, keypad, stylus, trackball, track wheel, etc.), a tile 202 can be opened-up to reveal additional tiles (see e.g., tiles 744, 754 of FIGS. 18 and 19, respectively) associated with the main tiles 302. Additionally, in response to a user input (via e.g., mouse, keypad, stylus, trackball, track wheel, etc.), a tile 202 can be opened-up to reveal the underlying data causing the displayed status of the tiles.

Figure 4A:
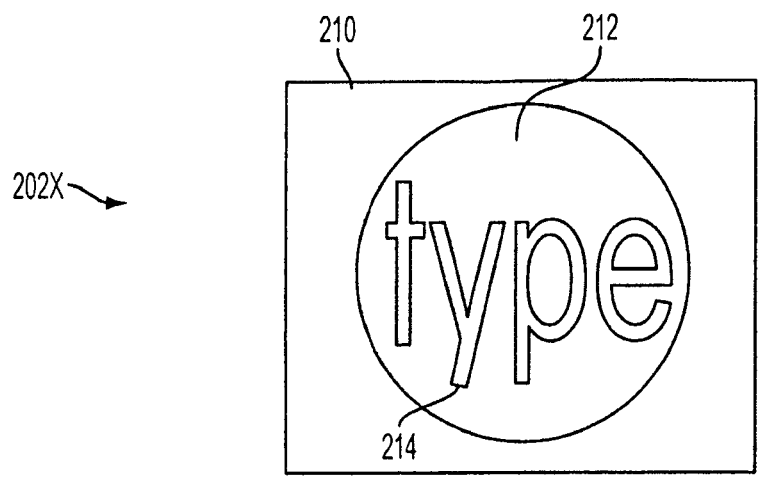
FIGS. 4a and 4b illustrate the concept of layering utilized in a system constructed in accordance with an embodiment of the invention.
Figure 4B:
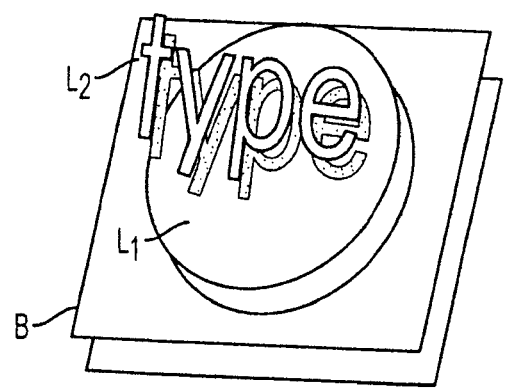

FIGS. 4a and 4b illustrate the concept of layering while FIGS. 5-10 illustrate a specific example of an embodiment of the invention. In FIG. 4a, a display tile 202x is shown having the text "type" 214 inside a circle 212 and on top of a background 210. Viewing FIG. 4a, it appears that there is only one unified image. In accordance with an embodiment described herein, and as illustrated in FIG. 4b, there are actually three separate image layers: (1) a first layer L1 containing the circle; (2) a second layer L2 containing the text "type"; and (3) a background B. The layers L1, L2 contain one image each, the remaining portions of the layer are transparent such that when one layer L2 is stacked over another layer L1 (and over the background B) each layer image is displayed in what appears to be a single image. This allows one image to be changed without disturbing the other images on other layers.

Figure 5:
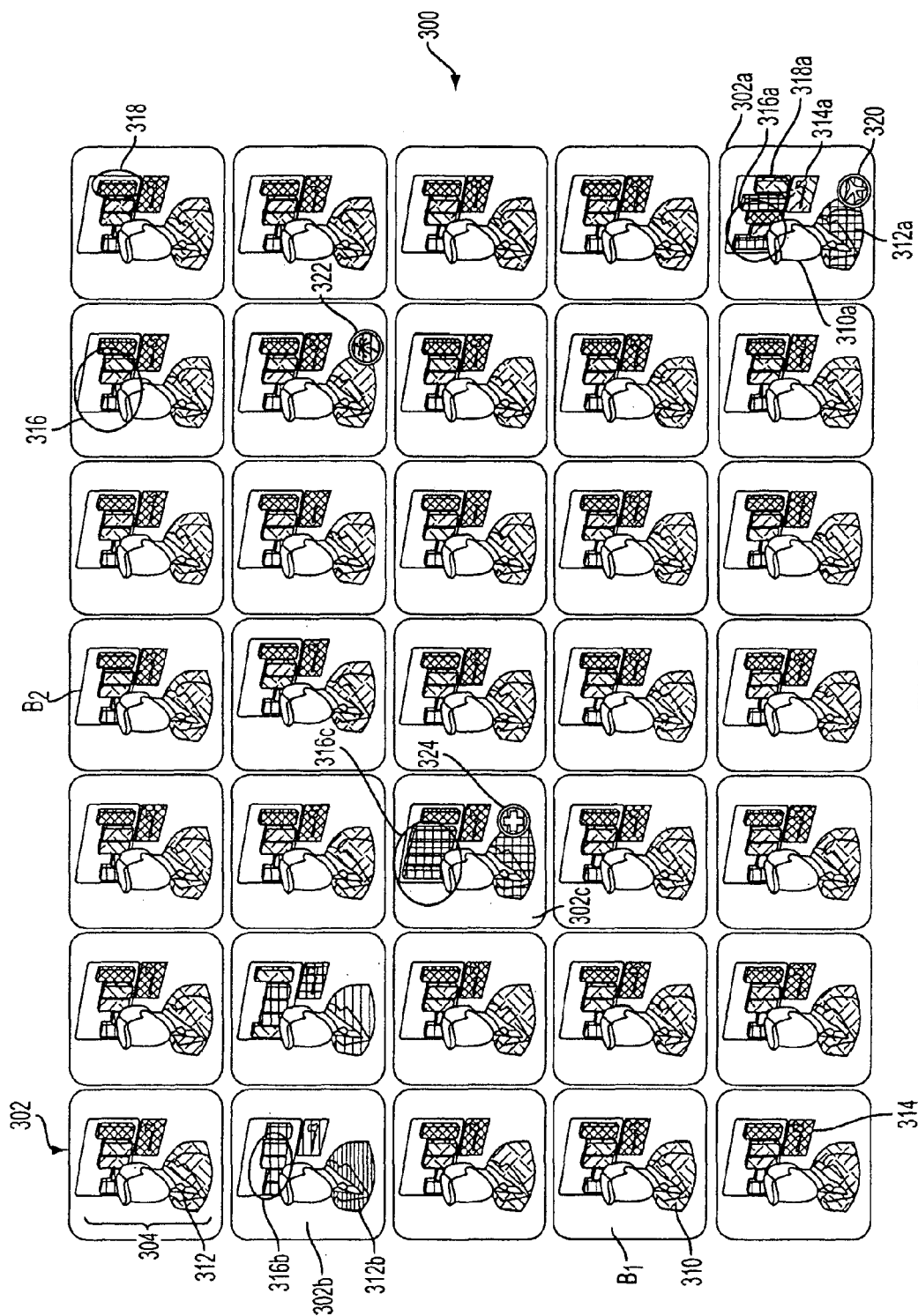
FIG. 5 illustrates another example mosaic display output from a system constructed in accordance with an embodiment of the invention.

FIG. 5 illustrates another example mosaic display 300 output from a system constructed in accordance with an embodiment of the invention (e.g., systems 10 or 110). The display 300 comprises a plurality of display tiles 302 shown in an array of rows and columns, each tile 302 comprising an image of an object 304 being monitored by the system. In the illustrated example, the object 304 corresponds to the status of employee performance such as e.g., the performance of a salesman or saleswoman (although only men images are illustrated). Each display tile 302 in the mosaic display 300 represents a particular salesman and the image object 304 illustrates key criteria/attributes associated with the salesman's performance that are to be monitored. In the illustrated example, the object 304 contains images of the salesman 310 upon which a suit image 312 will be used to represent the overall employee performance/score. The object 304 will also include a credit card image 314 representing the salesman's expenses and a bar graph whereby the four left-most bars 316 represent the salesman's performance over the past four rolling quarters and the right-most bar 318 represents the salesman's sales pipeline. An out-of-office status image can also be displayed if the salesman is out of the office that day.

In the illustrated example, there is a palm tree image 322 for vacation, an airplane image 320 for travel, and a hospital cross image 324 for sick leave. If the employee is in the office, no out-of-office image is displayed. The illustrated example also contains white background B1 and bar graph background B2 images to help make the object 304 easier to view.

Each image 310, 312, 314, 316, 318, 320, 322, 324 within a tile 302 can be selected from one of a plurality of image layers. Most layers comprise the image associated with an attribute being monitored (e.g., credit card) in a color or with another type of marking that makes it clear what the status of the attribute is at that moment. For these layers, each layer is linked to a value, threshold, or range of values that represents a particular status of that attribute. Some layers contain a different image to represent a different status for an attribute. For example, the out-of-office status will have a clear image when the employee is in the office, a palm tree image 322 when the employee is on vacation, an airplane image 320 when the employee is on travel, and a hospital cross image 324 when the employee is out sick. The application server 120 (FIG. 2) determines from the monitored data which layer is to be displayed for a particular attribute so that a current state of that attribute is displayed within the tile 302. Other layers are merely background images B1, B2 or images to complete the overall object 304 (e.g., image 310).

The images of each layer are chosen to be easily recognizable as (or associated with) the attribute being monitored. For example, in the salesman example, there are layers comprising images that represent the salesman's expenses (credit card), performance over the past 4 rolling quarters (left-most 4 bars in the bar graph), sales pipeline (right-most bar in the bar graph), overall employee score (color of suit), and out of office status (e.g., a palm tree for vacation, an airplane for travel, cross for sick leave, etc.). The colors of the layers can be selected to represent the status of an attribute as follows: dark blue may indicate a status that is severely below what is expected; light blue may indicate a status that is slightly below what is expected; green may indicate a status that the salesman is meeting the expected performance; orange may indicate a status that is slightly above what is expected; and gold may indicate a status that greatly exceeds what is expected. Moreover, referring in this example to the bar graph, the images on the layers can have different sizes. For example, the size of the bars in the bar graph may vary from no bar to a very large bar to further indicate the status of the salesman's performance during the quarters (or the size of the associated pipeline).

To achieve the bottom right employee tile 302a, there is one layer containing a gold suit image 312a, one layer containing a green credit card image 314a, four layers containing one of the four left-most bars 316a in the bar graph (the first layer contains a long yellow bar, the second layer contains a short green bar, the third layer contains a longer orange bar, and the fourth one containing another long yellow bar), one layer containing a mid-size green right-most bar image 318a, and one layer containing the airplane image 320 for the business travel out-of-office status. By comparison, tile 302b contains a blue suite image 3126 and shorter blue left-most bar images 316b in its bar graph, which represent different statuses for the salesman associated with tile 302b when compared to the salesman associated with tile 302a. Tile 302c, which represents another salesman, illustrates four of the largest available left-most bars 316, each in a gold color, which in the illustrated example is an indication of the highest achievable status for the attribute. Tile 302c also indicates that the employee is out sick (via image 324).

In operation, when input data dictates that an attribute has a changed status, a new layer containing the appropriate image is brought to the top of the layers, which supplants the prior image of that element, but does not change the images of other elements/attributes being displayed thru other layers. The changing mosaic allows managers to quickly and accurately make the decisions required to maintain the appropriate operational level for the entire system (in this case a group of employees) and rapidly pinpoint areas that need to be addressed.

Figure 9:
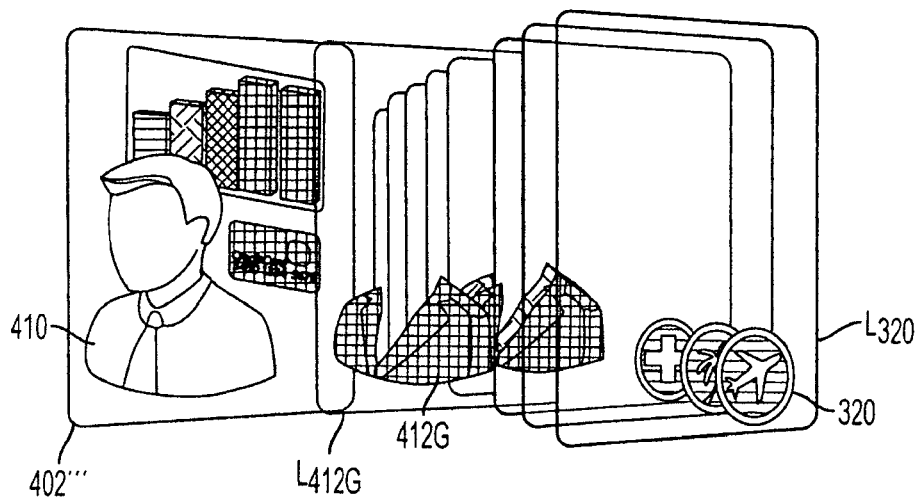
FIG. 9 illustrates a modified version of the FIG. 8 title using layering in accordance with an embodiment of the invention.
Figure 10:
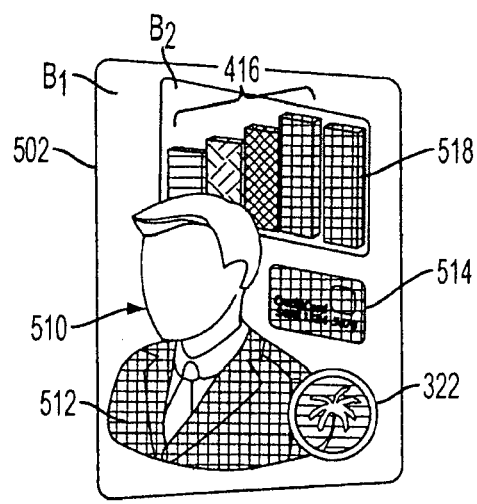
FIG. 10 illustrates a modified version of the FIG. 9 title in accordance with an embodiment of the invention.

The illustrations of FIGS. 6-10 are used to describe an example operation of the system of an embodiment of the invention whereby a particular salesman's status changes from the status displayed in FIG. 6 to the status displayed in FIG. 10. FIG. 6 illustrates a tile 402 comprising a salesman 410 having a green suit 412. A clear background B1 is also displayed. A light blue credit card image 414 indicates that the salesman's expenses are slightly below what is expected. Over the bar chart background B2, there are layers containing a small blue left-most bar 416a, a slightly longer green bar 416b, slightly longer orange bar 416c, and long gold bar 416d to represent the status of the salesman's last four rolling quarters (collectively 416). That is, four different bar heights and four different colors are used in the last four rolling quarters bar chart (collectively 416). Each bar color and length combination is its own layer representative of a particular status. A long, but not the longest, orange bar 418 is used to represent the salesman's pipeline, which e.g., is slightly above expectations. In addition, the employee is currently working in the office since there is no out-of-office image (i.e., a layer with a blank image in the out-of-office status position is used).

During the monitoring period, data is received indicating that the salesman's pipeline (represented by image 418) has improved to the greatly exceeds expectations status. As such, the application server 20 (FIG. 1), 120 (FIG. 2) determines that a new layer containing the tallest gold pipeline bar graph image 418' (FIG. 7) must be displayed. The layer associated with this image 418' is selected from the available layers (illustrated next to the updated tile 402' for explanation purposes only) and is brought to the top of the tile, changing the FIG. 6 tile 402 to the FIG. 7 tile 402'.

Subsequently, data is received indicating that the salesman's expenses have also improved to the status of greatly exceeds expectations. As such, the application server 20 (FIG. 1), 120 (FIG. 2) determines that a new layer containing a gold credit card image 414' (FIG. 8) must be displayed. The layer associated with this image 418' is selected from the available layers (illustrated next to the updated tile 402" for explanation purposes only) and is brought to the top of the tile, changing the FIG. 7 tile 402' to the FIG. 8 tile 402".

Subsequently, data is received indicating that the salesman's overall score has improved to the status of greatly exceeds expectations. As such, the application server 20 (FIG. 1), 120 (FIG. 2) determines that a new layer containing a gold suit image 412G (FIG. 9) must be displayed over the salesman image 410 (which when uncovered by a suit layer, comprises only a head, shirt and tie of the salesman). The layer L412G (FIG. 9) associated with the gold suit image 412G is selected from the available layers. FIG. 9 is at an intermediate stage where the selected layer L412G has not yet been brought to the top of the tile 402'''. FIG. 9 also shows a layer L320 comprising the airplane image 320 used to represent an out-of-office status; in this example, however layer L320 is not selected because the salesman is still in the office.

In FIG. 10, it can be seen that the layer L412G associated with the gold suit image 412G was brought to the top of the FIG. 9 tile 402''' creating an updated tile 502. At some point, data was received indicating that the salesman is on vacation and the application server 20 (FIG. 1), 120 (FIG. 2) determined that a new layer containing a palm tree image 322 must be displayed. As such, the FIG. 10 tile 502 also contains the palm tree image 322 to reflect that the salesman is on vacation. Thus, the completed tile 502 comprises a background B and a salesman image 510 covered by a layer comprising a gold suit image 512. The bar chart background B2 comprises the same left-most bar chart image 416 (as that status was not changed in this example) and an updated right-most bar 518 (to reflect the change in pipeline status described above). The tile 502 contains the updated credit card image 514 and the updated out-of-office palm tree image 322.

As can be seen from the above example, an observer can quickly determine changes in attribute status because of the layering technology used by the systems 10, 110. That is, layers containing images that are easily identifiable with the attribute being monitored are used. The size and color of the images may vary to further reflect changes in status of the attributes. Moreover, because identifiable images are being used to represent the status of the appropriate attribute, users/observers are not required to memorize a plurality of location-to-attribute correlations as is required to use the prior art systems. It should be appreciated that text and/or symbols may also be used as forms of labeling for the tiles or they may be used to represent additional status indicators; as with all layers, the images chosen, the color, size, text and/or symbology used to represent the status of an attribute should be chosen by a system administrator/observer or other authorized personnel to visually represent the attribute in a manner that can be easily identifiable. Accordingly, the embodiments described herein are not limited to any particular image/color/symbol/size combination.

Figure 11:
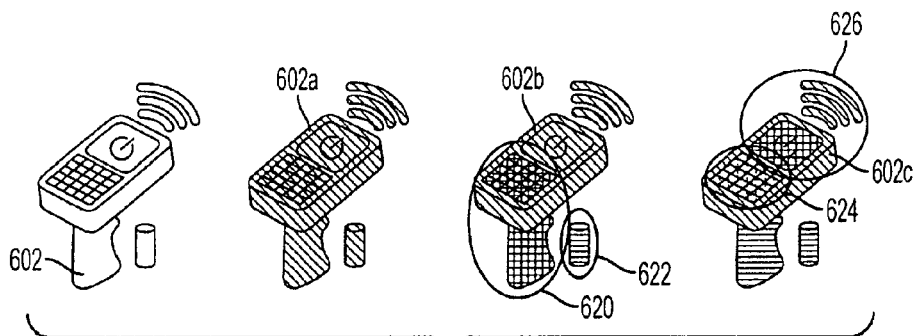
FIGS. 11-19 illustrate respective examples of tiles that can be displayed in accordance with embodiments of the invention.

FIGS. 11-19 illustrate respective examples of display tiles that can be displayed in accordance with embodiments of the invention. The examples are not intended to be limiting, and are supplied only to further illustrate the scalability and visual perspectives that may be achieved with the systems 10 (FIG. 1), 110 (FIG. 2) described herein. FIG. 11 illustrates tiles 602, 602a, 602b and 602c associated with network or communications devices being monitored. Tile 602 illustrates a gray device e.g., having no information at that point in time. Alternatively, the color gray could represent a particular status level, if desired. The tile 602 can be used to convey status information about the device battery, boots, key strokes, network connectivity, and/or number of scans. Tile 602a represents a green device representing one status of the attributes for the monitored device. Tile 602b, on the other hand, has a first portion 620 having a yellow status for the circled attributes of the device, and a second portion 622 having a blue status for the battery of the device. Each portion 620, 622 is a different layer placed on top of the prior layers of tiles 602 and 602a to reflect the change in status of the particular attributes of the device. Tile 602c has a portion 624 having a purple status for the circled keypad attribute and another second portion 626 having a yellow status for circled attribute of the device. Each portion 624, 626 is a different layer that is placed on top of the prior layers of tiles 602, 602a and 602b to reflect the change in status of the particular attributes of the device.

Figure 12:
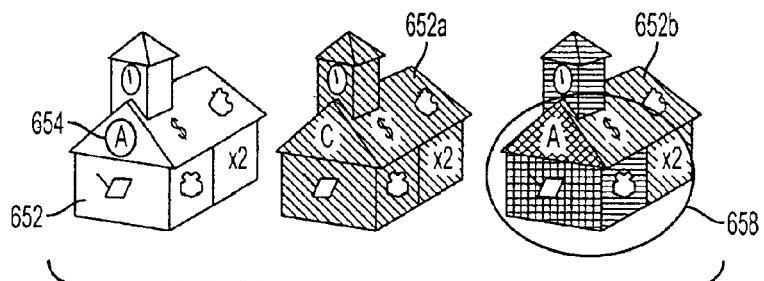

FIG. 12 illustrates tiles 652, 652a, 652b associated with a school being monitored by the systems 10 (FIG. 1), 110 (FIG. 2) described herein. Attributes whose statuses that can be monitored and displayed can include e.g., attendance, grades, test scores, budget, class size, poverty level and dual enrollment, to name a few. Tile 652 shows a gray school image, but includes several symbols on the school to reflect a different type of status. For example, image 654 includes the symbol "A" to reflect a grade for the school. Other symbols (e.g., $, apple, etc.) can also be used to reflect other attributes. The symbols may be a form of labeling for the tile 652 or they may be additional status indicators, as chosen by the system administrator/observer or other authorized personnel. Tile 652a represents a green school representing one status of the attributes for the monitored school. Tile 6526, includes several different colored portions, represented by the circle 658, each portion reflecting a separate status. As with all tiles described herein, each image/color/symbol combination illustrated in FIG. 12 is a respective image layer, which is associated with a threshold, range of values, etc. to visually represent a status of the attribute.

Figure 13:
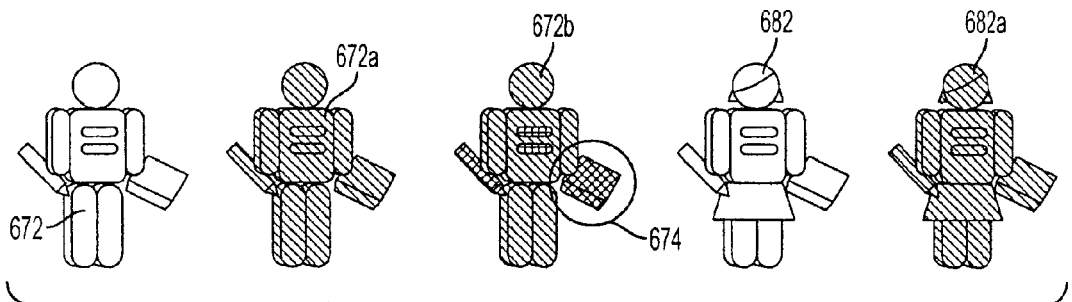

FIG. 13 illustrates tiles 672, 672a, 672b, 682, 682a associated with students being monitored by the systems 10 (FIG. 1), 110 (FIG. 2) described herein. Tiles 672, 672a, 6726 represent a male student while tiles 682, 682a represent a female student. Attributes whose statuses that can be monitored and displayed can include e.g., communications, life skills, social skills, writing, math, reading and discipline. Tiles 672 and 682 are gray indicating e.g., that no status information is presently available. Alternatively, the color gray could represent a particular status level, if desired. Tiles 672a, 682a are green representing a status of each attribute being associated with a green image. Tile 6726 has several different images (associated with different layers) in comparison to tile 672a such as the orange book image 674.

Figure 14:

FIG. 14 illustrates two tiles 692, 696 that may be suitable for monitoring military personnel. Tile 692 comprises an image of a blue soldier (one layer) having an image of a gun 694 (second layer) superimposed on the soldier. Tile 696 includes an image of multiple soldiers that may be used to represent a division, battalion, etc. being monitored.

Figure 15:
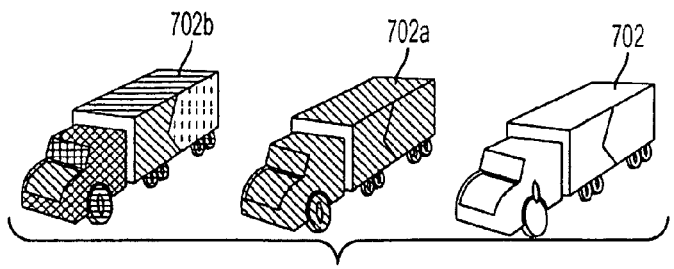

FIG. 15 illustrates tiles 702, 702a, 702b associated with delivery vehicles being monitored by the systems 10 (FIG. 1), 110 (FIG. 2) described herein. Attributes whose statuses that can be monitored and displayed can include e.g., time between stops, time at a stop, average time per call, number of deliveries, orders placed, vehicle utilization and miles per day. Tile 702 is gray indicating e.g., that no status information is presently available. Alternatively, the color gray could represent a particular status level, if desired. Tile 702a is green representing a status that each attribute is associated with a green image. Tile 702b has several colored portions (each associated with a different layer) in comparison to tile 702a such that several attributes have different status when compared to tile 702a.

Figure 16:
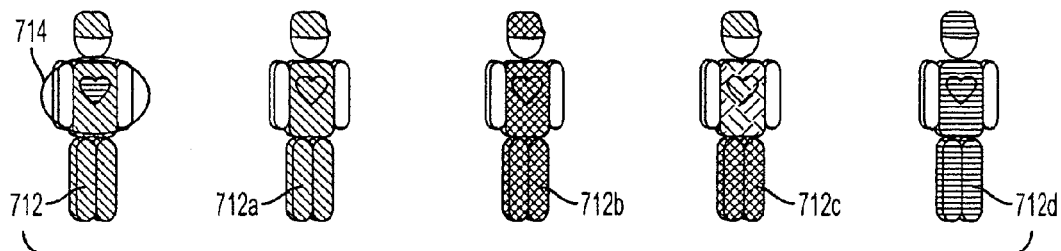

FIG. 16 illustrates tiles 712, 712a, 712b, 712c, 712d associated with patients being monitored by the systems 10 (FIG. 1), 110 (FIG. 2) described herein. Attributes whose statuses that can be monitored and displayed can include e.g., the patient's temperature, respiratory system, pulse and activity. Tile 712 contains an image of a green patient with a blue heart image 714, representing different statuses for the attributes of the patient. Tile 712a illustrates a green heart, which represents a change from tile 712 (while also providing its own status). Tile 712b illustrates the patient in all orange, tile 712d illustrates the patient in all blue while tile 712c contains different color images for the legs, chest and heart and head. As with all other tiles discussed herein, each attribute status is displayed using an appropriate layer, which appear as a single unified image.

Figure 17:
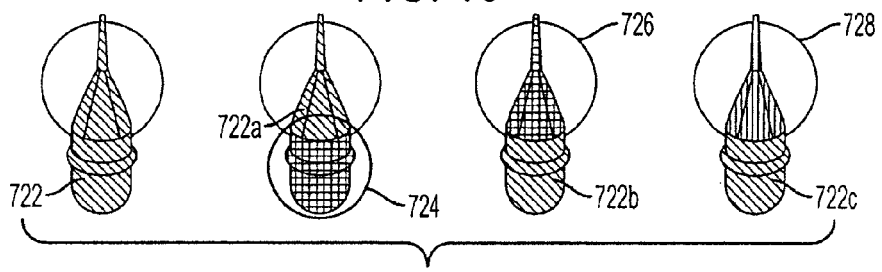

FIG. 17 illustrates tiles 722, 722a, 7226, 722c associated with a communications device being monitored by the systems 10 (FIG. 1), 110 (FIG. 2) described herein. Attributes whose statuses can be monitored and displayed using appropriate layers can include e.g., communications and electrical functionality of the device. Tile 722 illustrates all attributes having a green status. Tile 722a illustrates that a layer having a yellow image 724 has been placed over a green portion in tile 722. Tile 722b illustrates that a layer having a yellow image 726 has been placed over a green portion in tile 722a and that a layer having a green image has been placed over the layer comprising the yellow image 724 in tile 722a. Tile 722c illustrates that a layer comprising a red image 728 has been placed over the layer comprising the yellow image 726 of tile 712b.

Figure 18:
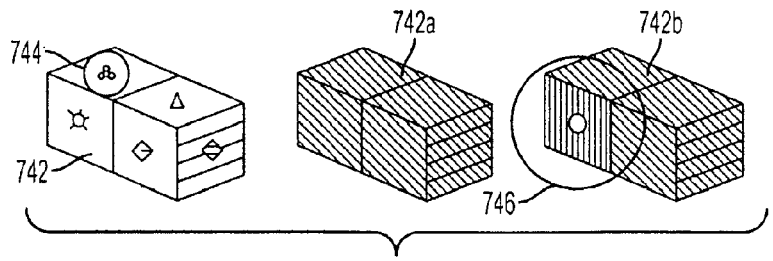

FIG. 18 illustrates tiles 742, 742a, 742b associated with a cargo container being monitored by the systems 10 (FIG. 1), 110 (FIG. 2) described herein. Attributes whose statuses can be monitored and displayed using appropriate layers can include the contents of the container such as e.g., urine, chemicals, explosives, flammable material and radioactive material. Tile 742 illustrates all attributes having a gray status (which may mean that no information has been received or it may mean that a particular status level has been reached), but also includes symbols such as e.g., the radioactive symbol image 744. The symbols may be a form of labeling for the tile 742 or they may be additional status indicators, as chosen by the system administrator/observer or other authorized personnel. It should be appreciated that the symbols are provided on layers that can be superimposed on other layers containing the color/shape of the appropriate portions of the container or that the symbol and the color/shape of the appropriate portion of the container may be on the same layer, if desired. Tile 742a illustrates that all attributes have a green status; moreover, tile 742a does not contain any symbols. Tile 742b illustrates that one portion of the container has changed status when compared to tile 742a. That is, tile 742b contains an image 746 that is a red portion of the container along with a star symbol representing that the container now contains explosive materials.

Figure 19:
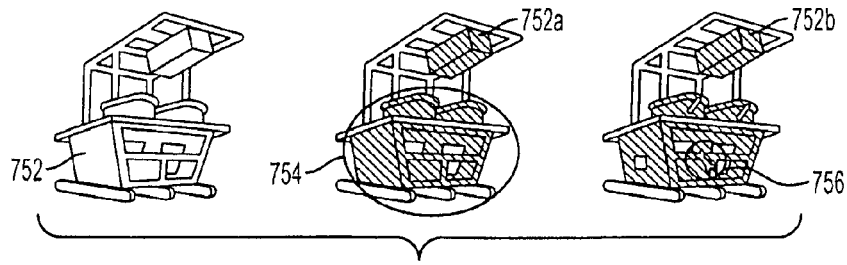

FIG. 19 illustrates tiles 752, 752a, 752b associated with a vessel being monitored by the systems 10 (FIG. 1), 110 (FIG. 2) described herein. Attributes whose statuses that can be monitored and displayed using appropriate layers can include the fuel, electrical and mechanical status of the vessel. Tile 552 is gray indicating e.g., that no status information is presently available. Alternatively, the color gray could represent a particular status level, if desired. Tile 752a illustrates that some attributes have a green status as shown e.g., by green image 754. Tile 752b illustrates that one portion of the vessel now contains a wrench symbol image 756 to represent a mechanical status of the vessel. The symbol may be a form of labeling for the tile 752b or it may be another status indicator, as chosen by the system administrator/observer or other authorized personnel.

Figure 20:
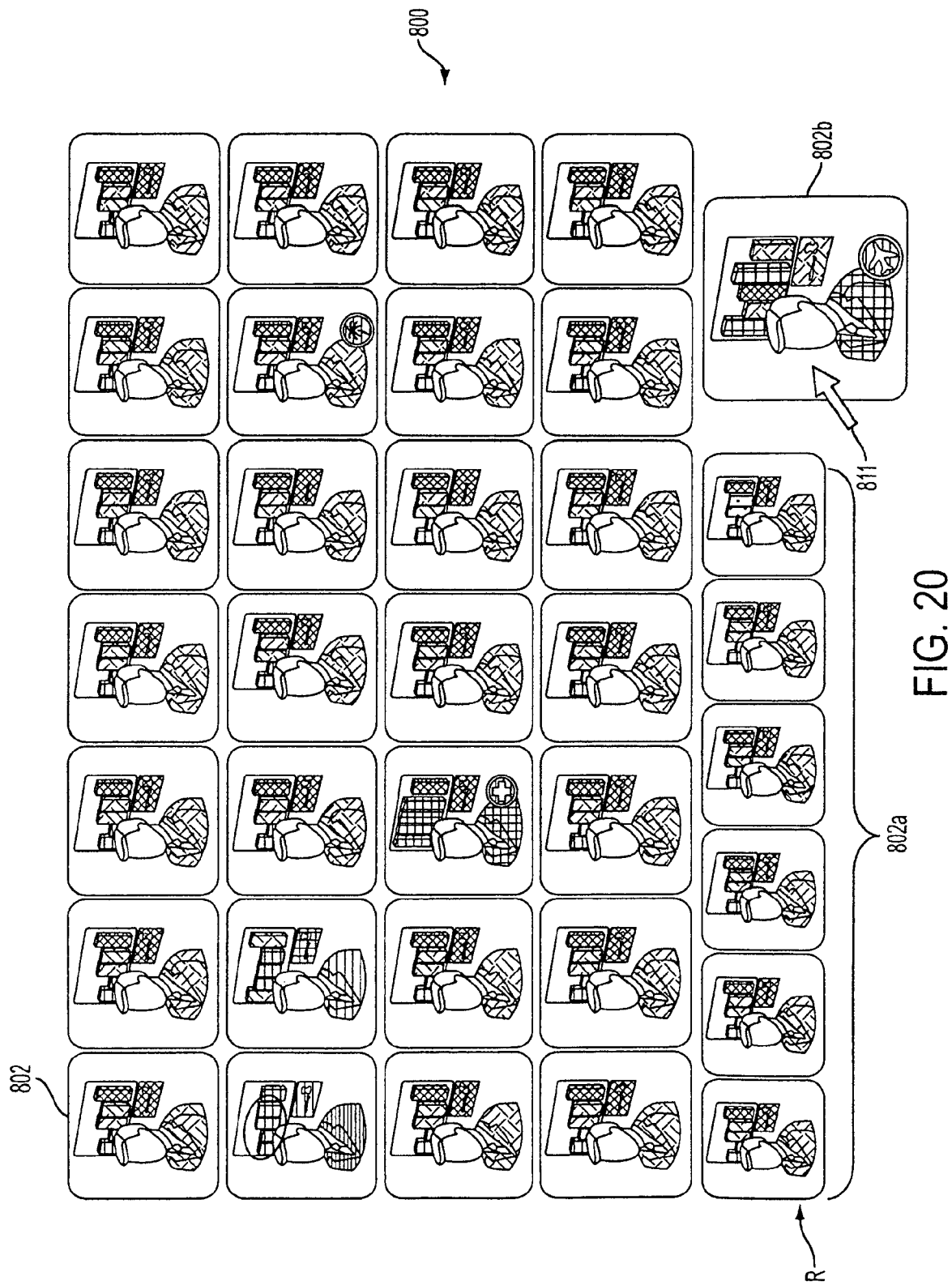
FIG. 20 illustrates an example mosaic display whereby one tile is magnified (and other tiles are shifted and shrunk) in accordance with an embodiment of the invention.

FIG. 20 illustrates an example mosaic display 800 whereby one tile 802b is magnified (and other tiles 802a are shifted and shrunk) in accordance with an embodiment of the invention. The mosaic display 800 comprises a plurality of tiles 802 and normally has the appearance of the mosaic 300 illustrated in FIG. 5. However, the systems 10 (FIG. 1), 110 (FIG. 2) described herein allow a user to move a cursor 811 (via e.g., mouse, keypad, stylus, trackball, track wheel, etc.) over a tile of interest (e.g., tile 802b) so that the user can see an enlarged tile. In response to the cursor movement and/or selection by the user, the application server 20 (FIG. 1), 120 (FIG. 2) enlarges/magnifies (i.e., proportionally increases the size of) tile 802b. At the same time, the application server 20 (FIG. 1), 120 (FIG. 2) shrinks (i.e., proportionally decreases the size of) other tiles 802*a* in the same row R as tile 802*b* so that all of the tiles in the mosaic 800 can still be viewed.

The processing described herein may be implemented in one or more hardware, software, or hybrid components residing in (or distributed among) one or more local or remote systems. Indeed, even a single general purpose computer executing a computer program stored on a recording medium to produce the functionality and/or implement any of the storage devices referred to herein may be utilized to implement the illustrated embodiments. User interface devices utilized by in or in conjunction with the systems 10, 110 may be any device used to input and/or output information. The interface devices may be implemented as a graphical user interface (GUI) containing a display or the like, or may be a link to other user input/output devices known in the art.

The above description and drawings illustrate various embodiments It should be appreciated that modifications, though presently unforeseeable, of these embodiments that can be made without departing from the spirit and scope of the invention which is defined by the following claims.

What is claimed as new and desired to be protected by Letters Patent of the United States is:

1. A display method comprising:
   receiving data related to a plurality of status attributes for each object of interest, each status attribute having an icon associated therewith;
   determining an icon display characteristic for each icon based upon the received data and indicative of the associated status attribute;
   generating a plurality of virtual image layers, each virtual image layer associated with a respective determined icon display characteristic;
   generating a respective display tile for each object of interest based upon the plurality of virtual image layers;
   displaying a mosaic image on a display based upon a combination of the display tiles; and
   updating the mosaic image based upon a change in received data associated with the at least one mosaic image.

2. The method of claim 1, wherein updating the mosaic image based upon a change in received data comprises updating a given icon display characteristic based upon a change in received data.

3. The method of claim 1, wherein the icon display characteristic comprises an icon display color.

4. The method of claim 1, wherein the icon display characteristic comprises an icon display size.

5. The method of claim 1, wherein the icon display characteristic comprises an icon display shape.

6. The method of claim 1, wherein the received data comprises real time data.

7. The method of claim 1, further comprising enlarging a display size of user selected display tile on the display.

8. The method of claim 7, further comprising reducing a display size of at least one other display tile in the mosaic.

9. A display method comprising:
   using a processor and associated memory to receive data related to a plurality of status attributes for each object of interest, each status attribute having an icon associated therewith,
   determine an icon display characteristic for each icon based upon the received data and indicative of the associated status attribute,
   generate a plurality of virtual image layers, each virtual image layer associated with a respective determined icon display characteristic,
   generate a respective display tile for each object of interest based upon the plurality of virtual image layers,
   display a mosaic image on a display based upon a combination of the display tiles, and
   update the mosaic image based upon a change in received data.

10. The method of claim 9, wherein using the processor and associated memory to update the mosaic images based upon a change in received data comprises using the processor and associated memory to update a given icon display characteristic based upon a change in received data.

11. The method of claim 9, wherein the icon display characteristic comprises at least one of an icon display color, an icon display size, and an icon display shape.

12. The method of claim 9, wherein the received data comprises real time data.

13. A system comprising:
   a display; and
   at least one server coupled to said display and configured to
   receive data related to a plurality of status attributes for each object of interest, each status attribute having an icon associated therewith,
   determine an icon display characteristic for each icon based upon the received data and indicative of the associated status attribute,
   generate a plurality of virtual image layers, each virtual image layer associated with a respective determined icon display characteristic,
   generate a respective display tile for each object of interest based upon the plurality of virtual image layers,
   display a mosaic image on a display based upon a combination of the display tiles, and
   update the mosaic image based upon a change in received data.

14. The system of claim 13, wherein update of the mosaic image based upon a change in received data comprises update of a given icon display characteristic based upon a change in received data.

15. The system of claim 13, wherein the icon display characteristic comprises at least one of an icon display color, an icon display size, and an icon display shape.

16. A non-transitory computer readable medium comprising computer-executable instructions for performing steps comprising:
   receiving data related to a plurality of status attributes for each object of interest, each status attribute having an icon associated therewith;
   determining an icon display characteristic for each icon based upon the received data and indicative of the associated status attribute;
   generating a plurality of virtual image layers, each virtual image layer associated with a respective determined icon display characteristic;
   generating a respective display tile for each object of interest based upon the plurality of virtual image layers,
   displaying a mosaic image on a display based upon a combination of the display tiles; and
   updating the mosaic image based upon a change in received data.

17. The non-transitory computer readable medium of claim 16, wherein the computer-executable instructions for updating the mosaic image based upon a change in received data comprise updating a given icon display characteristic based upon a change in received data.

18. The non-transitory computer readable medium of claim 16, wherein the icon display characteristic comprises at least one of an icon display color, an icon display size, and an icon display shape.

* * * * *